J. COYNE.
CLEAN-OUT DEVICE FOR PITOT TUBES.
APPLICATION FILED JULY 5, 1921.
1,438,811. Patented Dec. 12, 1922.
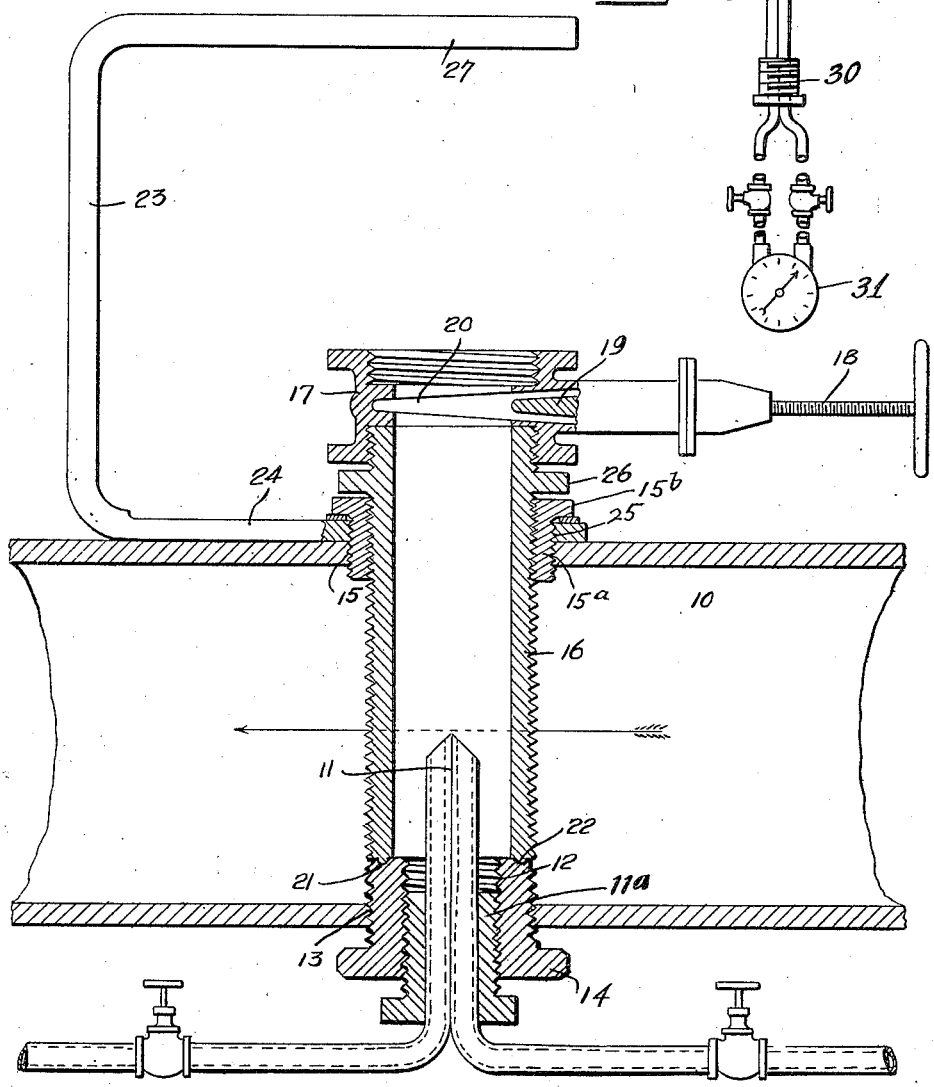
WITNESSES
H. J. Walker
Hugh H. Ott
INVENTOR
JAMES COYNE
BY
ATTORNEYS Patented Dec. 12, 1922.

1,438,811

UNITED STATES PATENT OFFICE.

JAMES COYNE, OF PITTSBURGH, PENNSYLVANIA.

CLEAN-OUT DEVICE FOR PITOT TUBES.

Application filed July 5, 1921. Serial No. 482,437.

*To all whom it may concern:*

Be it known that I, JAMES COYNE, a citizen of the United States, and a resident of Pittsburgh, in the county of Allegheny and State of Pennsylvania, have invented a new and Improved Clean-Out Device for Pitot Tubes, of which the following is a full, clear, and exact description.

The present invention has relation to flow meters for measuring steam, gases, or other liquids or fluids and refers more particularly to a clean-out device for Pitot tubes used in connection with said flow meters.

Where Pitot tubes are employed in connection with flow meters for measuring steam, gases or other liquids or fluids they frequently become clogged with foreign matter or are rendered otherwise defective in their operation, and it necessarily results in the shutting off of the line to permit of their removal, examination and cleansing according to the present practice.

It is, therefore, one of the principal objects of the present invention to provide a means for associating the Pitot tube with a conduit or supply pipe which permits of the examination, removal and cleansing of the Pitot tubes without the necessity of cutting off the passage of the steam, gases, liquids or other fluids through the conduit or supply pipe in order to save time, labor and expense necessitated in cutting off and draining said conduit.

The device is further useful and of advantage in boiler plants or other places where it is desired to run tests with the aid of portable flow meters in which instance the Pitot tubes are shifted from one supply pipe to another to save the expense of separate equipment.

The invention further contemplates a device of the character described which permits of the removal of internal pipes inserted for tests or other purposes and wells used in connection with temperature recorders or in places where it is undesirable to remove the Pitot tube for cleaning and a vacuum is available for cleansing the tube openings while the same remains in place.

With the above recited and other objects, advantages and uses in view the invention resides in the novel construction, combination and arrangement of parts which will be hereinafter more fully set forth in the specification, pointed out in the appended claims, and illustrated in the accompanying drawing.

Figure 1 illustrates a fragmentary longitudinal sectional view through a conduit or supply pipe equipped with a clean out device and a flow meter Pitot tube associated therewith, illustrating the same in a position to permit of the examination, cleaning or removal of the Pitot tube without the necessity of cutting off the flow of the contents of said conduit.

Fig. 2 is a diagrammatic view of a portable flow meter and Pitot tube of any well known type which may be employed in connection with the clean-out device.

Referring to the drawing by characters, 10 designates a conduit or supply pipe through which steam, gases, liquids or other fluids are adapted to pass. Under the present practice the Pitot tube which is operatively connected with a flow meter is inserted directly through one of the sides of the pipe for the purpose of measuring or testing the same, said Pitot tube being designed to be constantly associated with the conduit, except when the same is removed for the purpose of cleaning the openings therein or examining the same when the operation of the flow meter is defective. Under this practice it is necessary to cut off the flow of the liquids or fluids through the supply pipe prior to the removal of the Pitot tube. In the present instance, the Pitot tube 11 extends through an externally threaded plug 11ª which plug is detachably associated with the threaded bore of a bushing 12. The bushing 12 is threadedly received in an opening 13 in one side of the conduit or supply pipe 10, said bushing being provided with a wrench engaging bead 14 for driving the same in place in the opening 13.

The pipe 10 is provided with a similar threaded opening 15 diametrically opposite to the opening 13 which receives an interiorly and exteriorly threaded bushing 15ª through which a tubular sleeve 16 is threaded. The outer exposed extremity of the sleeve 16 has secured thereto a suitable cut-off valve 17 preferably of the gate valve type provided with a manipulating stem 18 which operates to move the gate 19 into or out of contact with the seat 20 whereby the outer end of the sleeve is closed and sealed. The inner end of the bushing 12 is provided with an annular concentric groove 21 constituting a seat for an annular bead 22 provided on the inner end of the sleeve 16. Normally the sleeve 16 is separated from the bushing with its inner end disposed adjacent the inner periphery of the pipe 10 whereby the Pitot tube is exposed to the flow of the contents therethrough whereby the flow meter will operate.

Where the meter readings indicate trouble in the Pitot tube and it becomes necessary to examine the same, the gate valve on the sleeve is left closed and the latter is screwed into the pipe until its inner end contacts with the bushing 12 and the bead 22 seats in the groove 21. It will thus be seen that an effective dam is provided around the Pitot tube without cutting off the flow of the contents through the supply pipe. The gate valve is then opened and a flashlight may be used to examine the Pitot tube. If same is only slightly clogged a small rod or tube can be introduced through the outer end of the sleeve and the cleaning done without removing the Pitot tube from the sleeve. However, if found necessary the Pitot tube can be withdrawn, thoroughly cleaned and placed in position, after which the gate valve is closed and the sleeve is unscrewed to dispose its inner end adjacent the inner periphery of the pipe.

In order to prevent casual or accidental displacement and entire removal of the sleeve from threaded opening 15, a yoke 23 is provided, one leg 24 thereof having a threaded opening 25 to receive the bushing 15ª arranged adjacent to the conduit pipe 10 and secured with its threaded opening in register with the opening 15 therein, the head 15ᵇ of the sleeve retaining the same in place. A multi-faced boss is provided on the sleeve to effect the threading and unthreading of the sleeve through the bushing. The remaining leg 27 is disposed in the path of movement of the outer end of the sleeve and valve 17, the same being so spaced as to cause the contact of the outer end of the sleeve prior to the displacement of the inner end from the bushing 15ª. It is, of course, to be understood that in order to reduce the cost of the outfit, a reducer may be threaded on the outer extremity of the sleeve and a smaller valve or cock utilized in lieu of a gate valve or cock of the full size of the sleeve.

It will thus be seen that the examination, removal and cleansing of the Pitot tube may be accomplished without cutting off the flow of the fluid or liquid through the supply pipe. Another use of which the device is capable is where it is desired to run tests with a portable flow meter of the type illustrated in Fig. 2 in which instance the sleeve 16 is screwed in with the bead 22 engaged with the groove 21. The plug 30 Pitot tube of the portable apparatus 31 when it is desired to make a test is inserted through the bushing and after closing the gate valve the tube is unscrewed to separate its inner end from the bushing to permit the flow of the contents therethrough to the flow meter. When the test has been completed, the sleeve is again screwed into contact with the bushing and the Pitot tube is removed, after which the sleeve is unscrewed to the inner edge of the pipe and the gate valve left closed. The contents of the pipe may then flow through the same without interruption or obstruction.

The device is capable of use with standard and special styles of Pitot tubes by using various sizes of bushings and sleeves. The device is capable of use to permit of the removal of internal pipes inserted for tests or other purposes and wells used in connection with temperature recorders or for holding a liquid to permit of the insertion of thermometers.

While there has been illustrated and described a single and preferred embodiment of the invention, it is to be understood that the right is reserved to others than those actually set forth, to the full extent indicated by the general meaning of the terms in which the claims are expressed, and by variations in the phraseology of the same.

Having thus described my invention what I claim is:

1. A device to permit of the examination, removal and cleaning of a Pitot tube from a conduit pipe without cutting off the flow of the contents thereof, embodying a pair of members respectively insertable through the conduit pipe at diametrically opposite points and relatively adjustable toward and away from each other, one of said members removably receiving the Pitot tube, and means for closing the outer end of the other member when the same are separated.

2. A device of the character described comprising a conduit pipe, a member insertable through one side of the conduit pipe and adapted to removably receive a flow meter Pitot tube, a second member insertable through the opposite side of said conduit pipe and adjustable toward and away from the first member for encasing the Pitot tube, and means for closing the outer end of the second member when the same is separated from the first member.

3. A device of the character described comprising a conduit pipe, a member insertable through one side of the conduit pipe and adapted to removably receive a flow meter Pitot tube, a second member insertable through the opposite side of said conduit pipe and adjustable toward and away from the first member for encasing the Pitot tube, and means for limiting the separation of the second member from the first to prevent its entire removal from the conduit pipe.

4. A device for facilitating the examination, removal and cleansing of Pitot tubes in conduit pipes without cutting off the flow of the contents thereof, comprising a bushing, extending through one side of the conduit pipe and adapted to removably receive the Pitot tube, a sleeve extending through the opposite side and adjustable toward or away from the bushing, and means for closing the outer end of the sleeve when the same is separated from the bushing, said means being adapted to be opened when the sleeve is in contact with said bushing.

5. A device for facilitating the examination, removal and cleansing of Pitot tubes in conduit pipes without cutting off the flow of the contents thereof, comprising a bushing extending through one side of the conduit pipe and adapted to removably receive the Pitot tube, a sleeve extending through the opposite side and adjustable toward or away from the bushing, means for closing the outer end of the sleeve when the same is separated from the bushing, said means being adapted to be open when the sleeve is in contact with said bushing, and means disposed in the path of movement of the outer end of the sleeve for preventing the entire removal thereof from the conduit pipe.

JAMES COYNE.